(12) United States Patent
Cord et al.

(10) Patent No.: US 11,981,554 B2
(45) Date of Patent: May 14, 2024

(54) CONVEYOR FOR MOVING FOUR-WHEELED VEHICLES

(71) Applicant: Stanley Robotics, Versailles (FR)

(72) Inventors: Aurélien Cord, Paris (FR); Clément Boussard, Paris (FR)

(73) Assignee: Stanley Robotics, Versailles (FR)

( * ) Notice: Subject to any disclaimer, the term of this patent is extended or adjusted under 35 U.S.C. 154(b) by 176 days.

(21) Appl. No.: 17/416,343

(22) PCT Filed: Dec. 20, 2019

(86) PCT No.: PCT/FR2019/053228
§ 371 (c)(1),
(2) Date: Jun. 18, 2021

(87) PCT Pub. No.: WO2020/128380
PCT Pub. Date: Jun. 25, 2020

(65) Prior Publication Data
US 2022/0073330 A1    Mar. 10, 2022

(30) Foreign Application Priority Data

Dec. 20, 2018 (FR) .................................. 1873632
Jun. 14, 2019 (FR) .................................. 1906392

(51) Int. Cl.
*B60P 3/077* (2006.01)
*B66F 9/075* (2006.01)
*B66F 9/12* (2006.01)

(52) U.S. Cl.
CPC ............... *B66F 9/12* (2013.01); *B60P 3/077* (2013.01); *B66F 9/0754* (2013.01); *B66F 9/0755* (2013.01)

(58) Field of Classification Search
CPC .................................. B66F 7/246; E04H 6/36
See application file for complete search history.

(56) References Cited

U.S. PATENT DOCUMENTS

| 8,165,718 | B2 * | 4/2012 | Ota | B66F 9/063 700/250 |
| 9,259,986 | B2 * | 2/2016 | Slawson | B60G 17/015 |
| 11,214,976 | B2 * | 1/2022 | Cho | E04H 6/305 |

(Continued)

FOREIGN PATENT DOCUMENTS

| CN | 102264575 A | 11/2011 |
| CN | 102858593 A | 1/2013 |

(Continued)

OTHER PUBLICATIONS

Machine translation of Wo2019/068407 from espacenet. (Year: 2019).*

(Continued)

*Primary Examiner* — Mark C Hageman
(74) *Attorney, Agent, or Firm* — TraskBritt

(57) ABSTRACT

A conveyor for moving four-wheeled vehicles comprises a telescopic frame provided with tire-chock arms movable between a retracted position and a position in which they engage with the treads of the wheels. The conveyor comprises a propulsion unit made up of a front frame to which two lateral subunits are secured, each comprising a motorized and directional wheel, which can be oriented independently of one another and a means for coupling the telescopic frame with the front frame.

5 Claims, 2 Drawing Sheets

(56) References Cited

U.S. PATENT DOCUMENTS

| | | | |
|---|---|---|---|
| 11,312,415 B2* | 4/2022 | Tzivanopoulos | B60S 13/00 |
| 2012/0195722 A1 | 8/2012 | Nespor | |
| 2012/0248727 A1 | 10/2012 | Gaudet et al. | |
| 2015/0032252 A1* | 1/2015 | Galluzzo | B60P 1/5423 700/218 |
| 2018/0178995 A1 | 6/2018 | Kun | |
| 2019/0322205 A1* | 10/2019 | Dombrowski | B60S 13/00 |

FOREIGN PATENT DOCUMENTS

| | | | | |
|---|---|---|---|---|
| CN | 204728778 U | 10/2015 | | |
| CN | 205990052 U | 3/2017 | | |
| CN | 108166819 A | 6/2018 | | |
| CN | 207889613 U | 9/2018 | | |
| CN | 108612373 A | 10/2018 | | |
| CN | 208180866 U | 12/2018 | | |
| DE | 102017221655 A1 * | 4/2019 | | B60S 13/00 |
| EP | 0292537 B1 | 3/1992 | | |
| EP | 1795431 A1 * | 6/2007 | | B60K 17/30 |
| FR | 3036349 A1 | 11/2016 | | |
| WO | WO2016/189233 * | 12/2016 | | B60S 13/00 |
| WO | WO-2019068407 A1 * | 4/2019 | | B60S 13/00 |

OTHER PUBLICATIONS

Machine translation of EP-1795431-A1 from espacenet. (Year: 2007).*

International Search Report for International Application No. PCT/FR2019/053228 dated Apr. 9, 2020, 2 pages.

International Written Opinion for International Application No. PCT/FR2019/053228 dated Apr. 9, 2020, 5 pages.

Chinese First office action notice and Search Report for Chinese Application No. 201980083878.7, dated Feb. 24, 2023, 18 pages with English translation.

France Search Report for France Application No. 1873632, dated Oct. 8, 2019, 2 pages of Original Document Only.

France Search Report for France Application No. 1906392, dated Jun. 5, 2020, 2 pages of Original Document Only.

* cited by examiner

CONVEYOR FOR MOVING FOUR-WHEELED VEHICLES

CROSS-REFERENCE TO RELATED APPLICATIONS

This application is a national phase entry under 35 U.S.C. § 371 of International Patent Application PCT/FR2019/053228, filed Dec. 20, 2019, designating the United States of America and published as International Patent Publication WO 2020/128380 A1 on Jun. 25, 2020, which claims the benefit under Article 8 of the Patent Cooperation Treaty to French Patent Application Serial No. 1873632, filed Dec. 20, 2018 and French Patent Application Serial No. 1906392, filed Jun. 14, 2019.

TECHNICAL FIELD

The present disclosure relates to the field of autonomous equipment for conveying vehicles without the assistance of a driver and without rolling the vehicle on its wheels, for example, for movement between a vehicle drop-off point and a vehicle parking area, or between an exit from the automotive production line and a storage space, for example, on the site of a manufacturer, a distributor or a car dealership.

BACKGROUND

Such conveyors are designed to make it possible to load a vehicle without the intervention of the driver, the vehicle being able to be stationary, the doors locked. The conveyors consist of a longitudinal structure that can be slid under the vehicle. Laterally retractable systems clamp the tires of the vehicle to immobilize it with respect to the longitudinal structure and to lift the vehicle to loosen the tread surface of the tires from the ground. The conveyor can then move the vehicle, which is no longer in contact with the ground.

A vehicle transport solution is known in the state of the art, intended mainly for private cars, described in European patent EP0292537B1. It comprises eight lifting blocks, which are intended to be placed in pairs on both sides of a respective vehicle wheel, wherein a first pair and a second pair of lifting blocks are comprised in a first lifting assembly while a third pair and a fourth pair of lifting blocks are comprised in a second lifting assembly, wherein the first lifting assembly comprises a first carriage and in that the second lifting assembly comprises a second carriage; these carriages being arranged sequentially, one after the other, along a line (C—C) along which a vehicle must be driven on a supporting surface to be placed above the carriages with its longitudinal axis along the line.

Each lifting block is provided at one end with an arm, which can be rotated or swung about an axle connected to the respective carriages to go from an inwardly swung position in which the respective arms and the respective lifting blocks lie parallel or substantially parallel to the line (C—C), to an outwardly swung position, which is perpendicular or substantially perpendicular to the inwardly swung position, wherein each pair of lifting blocks is intended to be driven from its inwardly swung position to its outwardly swung position, thereby allowing the lifting blocks to be moved in beneath a respective vehicle wheel from both sides thereof, to thus lift the wheel, the distance between the two pairs of lifting blocks of each carriage in the outwardly swung position of these pairs of blocks corresponding to the track width or gauge of a vehicle whose wheels are to be lifted.

French patent FR3036349 is also known, describing a conveyor for moving four-wheeled vehicles, comprising a frame provided with retractable extensions, which are movable between a position in which they allow the movement of the frame under the vehicle, and a position in which they come into contact with the treads of the wheels, the frame is telescopic and comprises two segments each carrying a pair of arms. At least one of the pairs of arms is articulated to allow movement between a position perpendicular to the longitudinal axis of the frame with an extension at least equal to the track of the vehicle, and a folded-up position to occupy a width, which is less than the distance between the inner sides of the vehicle wheels. The segments are movable between a position where the arms are not in contact with the wheels, and a position where each arm comes into contact with the tread of one of the wheels, to raise or lower the vehicle.

Chinese patent application CN108612373 is also known, describing a transport robot consisting of a first frame body, a second frame body, a plurality of groups of driving wheels, at least four groups of clamping lifting mechanisms, a telescopic mechanism and a central holding mechanism. The first frame body and the second frame body are connected by the telescopic mechanism, and the first frame body and the second frame body are movable relative to the axial direction. The multiple groups of driving wheels are correspondingly arranged on the first frame body and the second frame body, and are used to drive the robot to be transported to move it. At least two groups of clamping lifting mechanisms are arranged on the first frame body and are distributed symmetrically with respect to a first steering shaft; and at least the other two groups of clamping lifting mechanisms are arranged on the second frame body and are distributed symmetrically with respect to the first steering shaft.

Chinese patent application CN108166819 is also known, which relates to a parking robot, in particular, a clamping-type parking robot, and belongs to the technical field of parking robots. The clamping-type parking robot comprises a front transport carriage, a rear transport carriage, and a telescopic sliding frame mechanism. The front end of the telescopic sliding frame mechanism is connected to the front transport carriage, the rear end of the telescopic sliding frame mechanism is connected to the rear transport carriage, and the bottom of the front transport carriage and the bottom of the rear transport carriage are each supplied with a group of universal wheels. The left corner and the right corner of the front end of the front transport carriage are provided with a radar-carrying guide wheel assembly and a guide wheel assembly, respectively, and the left corner and the right corner of the rear end of the rear transport carriage are provided with a radar-carrying guide wheel assembly and a guide wheel assembly, respectively. The left and right side of the front transport carriage and the left and right side of the rear transport carriage are each provided with a clamp assembly.

The solutions of the prior art are not completely satisfactory because the length of the conveyors makes them difficult to maneuver. The platform supporting the vehicle must have a length at least equal to that of the vehicle, increased by the motorized equipment. The turning radius is therefore large, which is detrimental for movement in a restricted space, for example, in an aisle formed between two parking areas, where the conveyed vehicle must be positioned in a position perpendicular to the axis of the aisle to then allow engagement between two vehicles, which are already parked, for example.

Furthermore, the maintenance of such conveyors, which are subject to intensive use, is relatively complex and leads to relatively lengthy immobilization of the conveyors under repair.

In general, the solutions of the prior art lack reliability and maneuverability for intensive use in configurations requiring very precise and sometimes complex movements, with very low lateral movements so as not to risk hitting a vehicle, which is already parked when inserting a line into a free space between two already occupied lines.

BRIEF SUMMARY

In order to address these drawbacks, the present disclosure relates in its most general sense to a conveyor for moving four-wheeled vehicles, comprising a telescopic frame provided with tire-chock arms movable between a retracted position and a position in which they engage with the treads of the wheels, characterized in that it comprises a propulsion unit made up of a front frame to which two lateral subunits are secured, each comprising a motorized and directional wheel, which can be oriented independently of one another and a means for coupling the telescopic frame with the front frame.

According to a first variant, the coupling means between the front frame and the telescopic frame comprises at least one vertical slide and a motorized cylinder controlling the relative position of the frames along the vertical axis.

According to a second variant, the retractable frame is formed by a first hollow proximal box with a thickness of less than 100 millimeters inside which a second distal box slides, the extension of which is motorized, the distal box comprising a caster with a thickness of less than 100 millimeters connected to the second box by a lift pad.

Advantageously, the first hollow proximal box is formed by a rigid framework closed at its upper face by removable plates.

Preferably, the first box is closed in a sealed manner.

According to another variant, the front frame comprises an extractable drawer for housing an electric battery.

According to another variant, the front frame comprises an extractable drawer for housing electronic circuits, the drawer comprising connectors on its rear face, which are complementary to connectors provided on the bottom of the front frame.

Advantageously, the front frame has signage means controlled as a function of the movements of the conveyor.

According to a particular embodiment, the signage means provide a light projection on the ground in front of the conveyor.

According to another embodiment, the front housing comprises a LIDAR-type sensor having a vertical aperture of between 30° and 60° and a 360° scan at the front and 180° at the rear.

BRIEF DESCRIPTION OF THE DRAWINGS

The present disclosure will be better understood on reading the following description, relative to a non-limiting embodiment illustrated by the accompanying drawings, in which.

DETAILED DESCRIPTION

Description of the General Architecture

Figure 1:
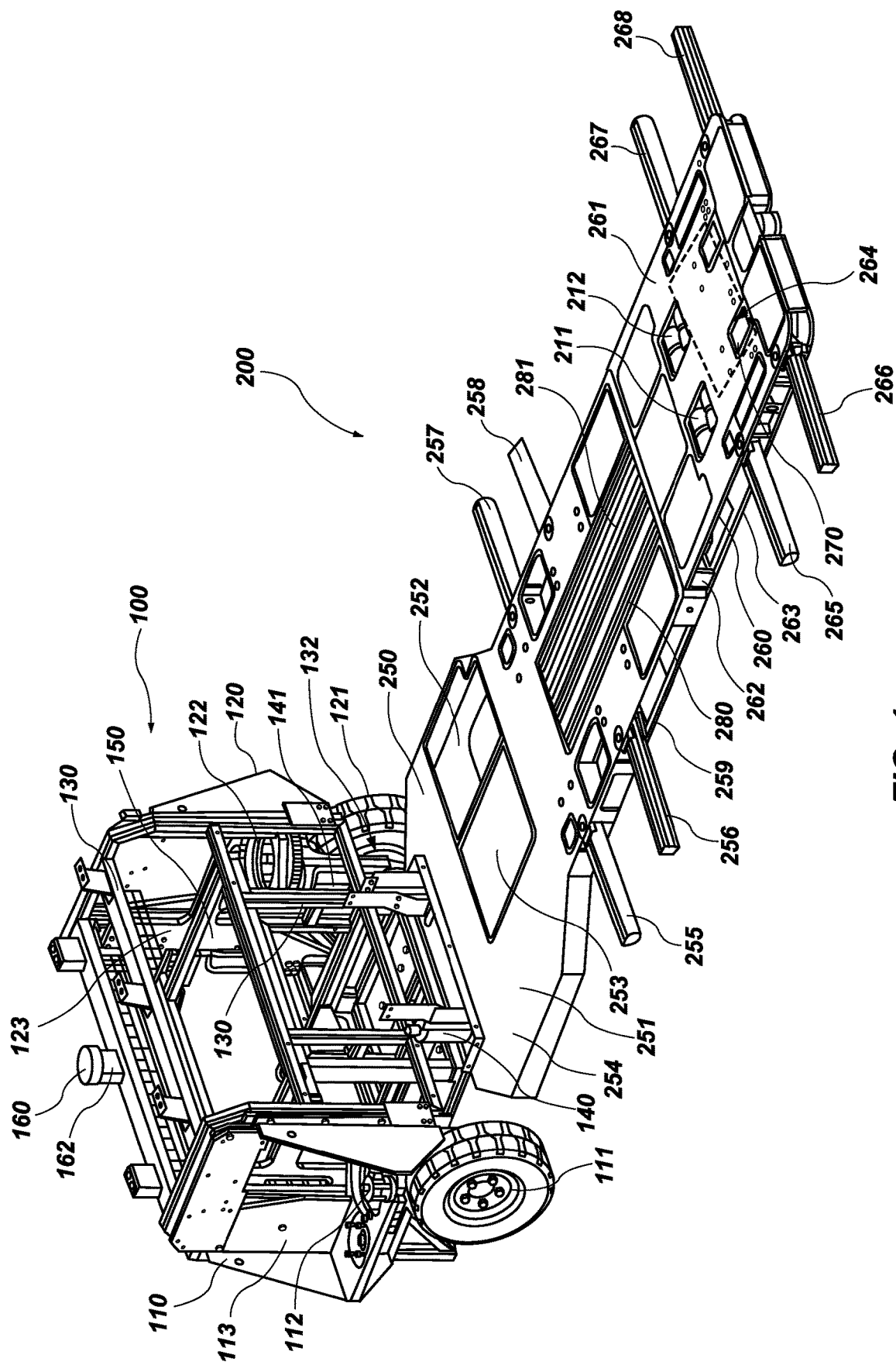
FIG. 1 shows a three-quarter rear top view of a conveyor according to the present disclosure.
Figure 2:
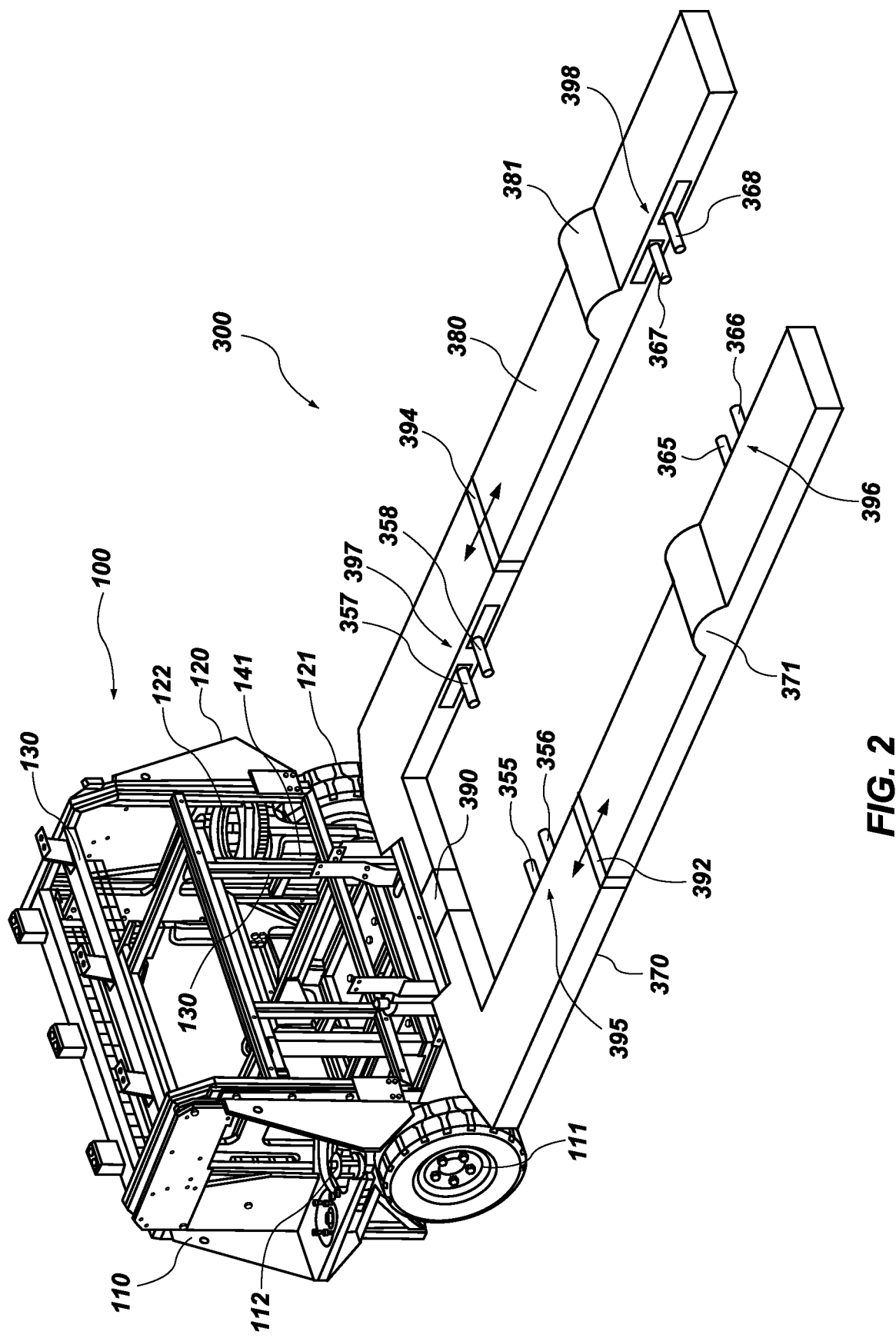
FIG. 2 shows a variant embodiment.

The conveyor includes a propulsion unit (100) and a conveyor platform (200). The propulsion unit (100) includes a rigid frame (130) produced by assembling metal beams.

The conveyor platform (200) is connected to the propulsion unit (100) by means of a height adjustment system (132) actuated by electric or pneumatic cylinders (140, 141).

The propulsion unit (100) is equipped with two motorized wheels (111, 121). The conveyor platform (200) is equipped with bearing rollers (211, 212) (e.g. casters) supported by a height adjustment system (264).

Description of the Propulsion Unit

The propulsion unit (100) includes a modular assembly that is easily removable to simplify maintenance. The assembly can be removed and replaced by disconnecting an electrical connector and unscrewing the bolts connecting the plate to the frame (130).

The tubular frame (130) serves as an assembly support for the various modular elements, which are mounted by screwing so as to be able to replace functional units very quickly and with simple operations.

Each motorized wheel (111, 121) is mounted on a functional steering unit (110, 120) (i.e. a lateral subunit) formed by a metal plate (113, 123), which is screwed to the side of the frame (130) and which comprises a motor or an actuator (112, 122) controlling the orientation of the motorized wheel (111, 121), respectively, via a vertical axle on which the stator of the motorized wheel (111, 121) is fixed, respectively. The motorized wheel (111, 121) is advantageously constituted by a rim forming the rotor of an electric machine, the stator of which is fixed on the directional axle driven by the motor or an actuator (112, 122).

Each of the functional steering units (110, 120) is independent. The angular orientation of the left motorized wheel (111) is controlled independently of the angular orientation of the right motorized wheel (112). Likewise, the speed and the direction of rotation of the left motorized wheel (111) are controlled independently of the speed and the direction of rotation of the right motorized wheel (112).

The frame (130) also defines a space for housing the electric batteries, which are mounted on an extractable drawer to facilitate replacement, as well as the pneumatic, electrical and electronic equipment also mounted on an extractable drawer to facilitate their replacement in case of failure. The extractable drawers have one or more connectors on their rear face ensuring the automatic connection and disconnection of the batteries and/or electrical and electronic circuits depending on the insertion or removal of the drawer.

The frame (130) also supports a pneumatic module ensuring the operation of the pneumatic elements of the platform (200).

The frame (130) also supports, at its lower part, an electric coil for recharging the batteries by induction, from a recharging station whose floor is equipped with an additional electric coil.

Alternatively, the propulsion unit (100) comprises a hydrogen fuel cell.

The frame also comprises a height adjustment system (132) for lifting the proximal platform (250) comprising electric cylinders (140, 141) controlling the height positioning of the attachment of the platform (250) to the propulsion unit (100).

The propulsion unit (100) optionally comprises a geolocation means, for example, a GPS module or a radiofrequency triangulation module, as well as a LIDAR (160)

positioned at the top of a mast (162) for acquiring information on the environment of the conveyor.

The propulsion unit (100) comprises a camber, for example, made from molded plastic material fixed to the frame (130), having access flaps to the drawers. It also has signaling means in the form of displays or traffic lights, or even means for projecting light at the front of the propulsion unit (100), projecting graphic information onto the ground representative of the sense and the direction of the current or future movement, or even displayed on a screen arranged on the body of the front unit.

Conveyor Platform (200)

The conveyor platform (200) includes a proximal platform (250) and a distal platform (260).

The proximal platform (250) is formed by a proximal hollow box (254) produced by an assembly of beams closed by metal plates (251 to 253), the plates (252, 253) concealing inspection hatches.

This proximal platform (250) has a first pair of fixed tire chock arms (255 and 257) and a first pair of retractable tire chock arms (256 and 258), which are actuated electrically or pneumatically, which can be folded against the lateral sides (259) of the proximal hollow box (254), or extend perpendicularly to the lateral sides (259) to come into contact with the treads of the wheels of the vehicle to be moved.

The conveyor platform (200) further comprises a distal platform (260) comprising a distal box (261) connected to the proximal platform (250) by a longitudinal slide (281) and a pneumatic cylinder or an electric cylinder (280) for adjusting the longitudinal extension and adapting it to the size of the vehicle.

This distal platform (260) also has a first pair of retractable tire chock arms (265, 267) and a second pair of retractable tire chock arms (266, 268), which are actuated electrically or pneumatically, which can be folded against the lateral sides (263) of the distal box (261), or extend perpendicularly to the lateral sides (263) to come into contact with the treads of the wheels of the vehicle to be moved.

The distal platform (260) has non-motorized rollers (211, 212) (e.g. casters) supported by a means for adjusting the height relative to the frame (262) of the distal platform (260), for example, by a pneumatic pad (270).

The rollers (211, 212) are arranged on either side of the median axis of the distal platform (260). Each roller (211, 212) is connected to the frame by the pneumatic pad (270).

The pneumatic pad (270) may comprise a right pneumatic pad and a left pneumatic pad, where the right pneumatic pad communicates by an air duct with the left pneumatic pad, which ensures self-balancing of the right and left rollers (211, 212).

Kinematics

The use of the conveyor is as follows:

First, the conveyor moves in reverse toward the vehicle. The two non-retractable arms (255, 257) closest to the propulsion unit (100) are extended transversely, the other retractable arms (256, 258, 265, 266, 267, and 268) being folded against the sides (259, 263) of the platforms (250, 260).

When the non-retractable arms (255, 257) come into contact with the tire treads of the vehicle, a sensor controls the stopping of the movement of the propulsion unit (100).

The other two retractable arms (256, 258) of the proximal platform (250) are then moved to lock the tires.

The retractable arms (265, 267) of the distal platform (260) closest to the proximal platform (250) are then deployed, and the movement of the distal platform (260) is controlled until these retractable arms (265, 267) come into contact with the tires of the other two wheels of the vehicle.

The movement of the distal platform (260) is then stopped and the longitudinal slide (281) is locked, and the tilting in the transverse position of the two other retractable arms (266, 268) of the distal platform (260) to lock the tires is controlled.

The vehicle is thus immobilized on the platform (200). The distal platform (260) is then lifted relative to the rollers (211, 212) and the proximal platform (250) is lifted relative to the propulsion unit (100), with a movement amplitude of about 150 millimeters, typically between 80 and 200 millimeters.

Variant Embodiments

According to a variant embodiment, the conveyor platform (300) consists of two side members (370, 380) spaced apart laterally by a width corresponding to the distance between the outer sidewalls of the tires of the car.

This distance may be adjustable by a mechanism (390) for adjusting the distance between the two side members (370, 380) by cylinders or electromechanical means.

The two side members (370, 380) are telescopic in the described example, and for this purpose have cylinders (392, 394) or electromagnetic means for modifying the longitudinal distance between two wheel holding zones (395, 396; 397, 398).

Each side members (370, 380) has two pairs of tire chock arms (355, 356; 365, 366; 357, 358; 367, 368) each forming a clamp to hold the lower part of the tread of a tire. The pairs of arms (355, 356; 365, 366; 357, 358; 367, 368) are oriented in the active position toward the center of the platform (200).

The two arms (355, 357) closest to the propulsion unit (100) are fixed. The other arms (356, 365, 366, 358, 367, 368) are foldable between a retracted position in which they are folded inside the structure of the side members (370, 380) and an active position where they are deployed inside the space delimited by the two side members (370, 380), to ensure the maintenance of the wheels of a vehicle to be moved.

The side members (370, 380) have accommodations (371, 381) to receive a wheel associated with a cylinder or a pneumatic pad making it possible to adjust the height of the side member (370, 380) relative to the ground, and loosen the tread surface of the tire relative to the ground.

The invention claimed is:

1. A conveyor for moving four-wheeled vehicles, the conveyor comprising:
a conveyor platform provided with tire-chock arms movable between a retracted position and a position in which the tire-chock arms engage with treads of tires of a four-wheeled vehicle; and
a propulsion unit including a frame to which two lateral subunits are secured, each of the two lateral subunits comprising a motorized and directional wheel configured to be oriented independently of one another and a height adjustment system that connects the conveyor platform to the frame of the propulsion unit,
wherein the conveyor platform includes a first hollow proximal box, a second distal box that slides within the first hollow proximal box, a longitudinal slide connecting the first hollow proximal box and the second distal box, and a pneumatic or electric cylinder configured to adjust a position of the second distal box relative to the first hollow proximal box, the second distal box comprising a caster connected to the second distal box by a lift pad.

2. The conveyor of claim 1, wherein the first hollow proximal box is formed by a rigid framework closed at its upper face by removable plates.

3. The conveyor of claim 2, wherein the first hollow proximal box is closed in a sealed manner.

4. The conveyor of claim 1, wherein the propulsion unit comprises a LIDAR sensor having a vertical aperture of between 30° and 60° and a 360° scan at a front of the propulsion unit.

5. The conveyor of claim 1, wherein the height adjustment system connecting the frame of the propulsion unit and the conveyor platform comprises a pneumatic or electric cylinder controlling a height of the conveyor platform relative to the propulsion unit.

* * * * *